United States Patent
Su et al.

(10) Patent No.: US 11,500,879 B2
(45) Date of Patent: Nov. 15, 2022

(54) METHOD, DEVICE, AND PROGRAM PRODUCT FOR MANAGING INDEX OF STREAMING DATA STORAGE SYSTEM

(71) Applicant: EMC IP Holding Company LLC, Hopkinton, MA (US)

(72) Inventors: Pengfei Su, Shanghai (CN); Lingling Yao, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 67 days.

(21) Appl. No.: 17/121,653

(22) Filed: Dec. 14, 2020

(65) Prior Publication Data

US 2022/0129468 A1 Apr. 28, 2022

(30) Foreign Application Priority Data

Oct. 23, 2020 (CN) .......................... 202011149599.7

(51) Int. Cl.
*G06F 17/00* (2019.01)
*G06F 7/00* (2006.01)
*G06F 16/2455* (2019.01)
*G06F 16/28* (2019.01)
*G06F 16/248* (2019.01)
*G06F 16/22* (2019.01)

(52) U.S. Cl.
CPC .... *G06F 16/24568* (2019.01); *G06F 16/2255* (2019.01); *G06F 16/248* (2019.01); *G06F 16/283* (2019.01)

(58) Field of Classification Search
CPC .......... G06F 16/24568; G06F 16/2255; G06F 16/283; G06F 16/248
USPC ......................................................... 707/769
See application file for complete search history.

(56) References Cited

U.S. PATENT DOCUMENTS

| | | | |
|---|---|---|---|
| 9,298,760 B1* | 3/2016 | Li | G06F 16/2228 |
| 9,823,982 B1* | 11/2017 | Schwartz | G06F 16/113 |
| 10,769,126 B1* | 9/2020 | Hagerup | G06F 16/2453 |
| 11,294,941 B1* | 4/2022 | Sammer | G06F 16/2471 |
| 2005/0065986 A1* | 3/2005 | Bixby | G06F 16/128 |
| 2007/0050333 A1* | 3/2007 | Vogler | G06F 16/22 |
| 2008/0215546 A1* | 9/2008 | Baum | G06F 16/24575 |
| 2008/0301119 A1* | 12/2008 | Selvaganesan | G06F 16/254 |
| | | | 707/999.005 |
| 2012/0078879 A1* | 3/2012 | Shuma | G06F 16/2228 |
| | | | 707/715 |

(Continued)

*Primary Examiner* — Pavan Mamillapalli
(74) *Attorney, Agent, or Firm* — Amin, Turocy & Watson, LLP

(57) ABSTRACT

An active layer of the index includes a first shard group, and shards in the first shard group are configured to store indexes of a part of data objects in a streaming storage system. In response to determining that the state of the first shard group meets a predetermined expansion condition, a second shard group is created in the index, and shards in the second shard group are configured to store indexes of data objects that will enter the storage system. The storage system is managed based on the shards in an active layer (where the second shard group is located) and frozen layers (where the second shard group) in the index. The number of shards in the storage system can be dynamically set to process streaming data at a relatively high speed, and it is suitable for processing streaming data that continuously enters the storage system.

19 Claims, 9 Drawing Sheets

(56) References Cited

U.S. PATENT DOCUMENTS

| | | | |
|---|---|---|---|
| 2012/0197900 A1* | 8/2012 | Mandre | G06F 16/283 |
| | | | 707/743 |
| 2012/0296845 A1* | 11/2012 | Andrews | G06Q 40/06 |
| | | | 705/36 R |
| 2016/0162524 A1* | 6/2016 | Bain | G06F 16/221 |
| | | | 707/741 |
| 2018/0039710 A1* | 2/2018 | Chen | G06F 16/9024 |
| 2018/0109550 A1* | 4/2018 | Huang | H04L 63/1425 |

* cited by examiner

METHOD, DEVICE, AND PROGRAM PRODUCT FOR MANAGING INDEX OF STREAMING DATA STORAGE SYSTEM

RELATED APPLICATION

The present application claims the benefit of priority to Chinese Patent Application No. 202011149599.7, filed on Oct. 23, 2020, which application is hereby incorporated into the present application by reference herein in its entirety.

TECHNICAL FIELD

Various implementations of the present disclosure relate to management of a storage system, and more particularly, to a method, a device, and a computer program product for managing an index in a streaming data storage system.

BACKGROUND

Streaming data is a continuous and endless data stream generated by various data sources. Generally speaking, the generation of streaming data is fast and the amount of data is large. Common examples of streaming data include log data of various application systems, measurement data of various sensors in the Internet of Things, various real-time data collected by monitoring systems, and the like. Streaming data may include a large amount of information and is usually stored in a time series.

In order to facilitate data search, technical solutions for creating an index for streaming data have been proposed at present. However, the existing technical solutions have poor expandability. With the passage of time, when the amount of streaming data continues to grow, the existing indexing technology cannot effectively manage more and more streaming data, which will cause the decrease of data access performance and further reduce the efficiency of later data analysis. At this moment, how to manage the index in the streaming data storage system in a more convenient and effective way has become a research hotspot.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

Therefore, it is desirable to develop and implement a technical solution for managing an index of a streaming data storage system in a more effective way. It is desirable that the technical solution is compatible with existing storage systems, and by modifying various configurations of the existing storage systems, an index of a storage system may be managed in a more effective way.

According to a first aspect of the present disclosure, a method for managing an index of a streaming data storage system is provided. An active layer of the index includes a first shard group, and shards in the first shard group are configured to store indexes of a part of data objects in the storage system. In this method, in response to determining that the state of the first shard group meets a predetermined expansion condition, a second shard group is created in the index, and shards in the second shard group are configured to store indexes of data objects that will enter the storage system. A layer where the second shard group is located is marked as the active layer. Layers other than the layer where the second shard group is located are marked as frozen layers. The storage system is managed based on the shards in the active layer and the frozen layers in the index.

According to a second aspect of the present disclosure, an electronic device is provided, including: at least one processor, a volatile memory, and a memory coupled to the at least one processor. The memory has instructions stored therein, and the instructions, when executed by the at least one processor, cause the device to execute the method according to the first aspect of the present disclosure.

According to a third aspect of the present disclosure, a computer program product is provided. The computer program product is tangibly stored on a non-transitory computer-readable medium and includes machine executable instructions which are used for executing the method according to the first aspect of the present disclosure.

BRIEF DESCRIPTION OF THE DRAWINGS

The features, advantages, and other aspects of respective implementations of the present disclosure will become more apparent from the following detailed description and in conjunction with the accompanying drawings. Certain implementations of the present disclosure are shown herein by way of example and not limitation. In the accompanying drawings.

DETAILED DESCRIPTION

Figure 1:
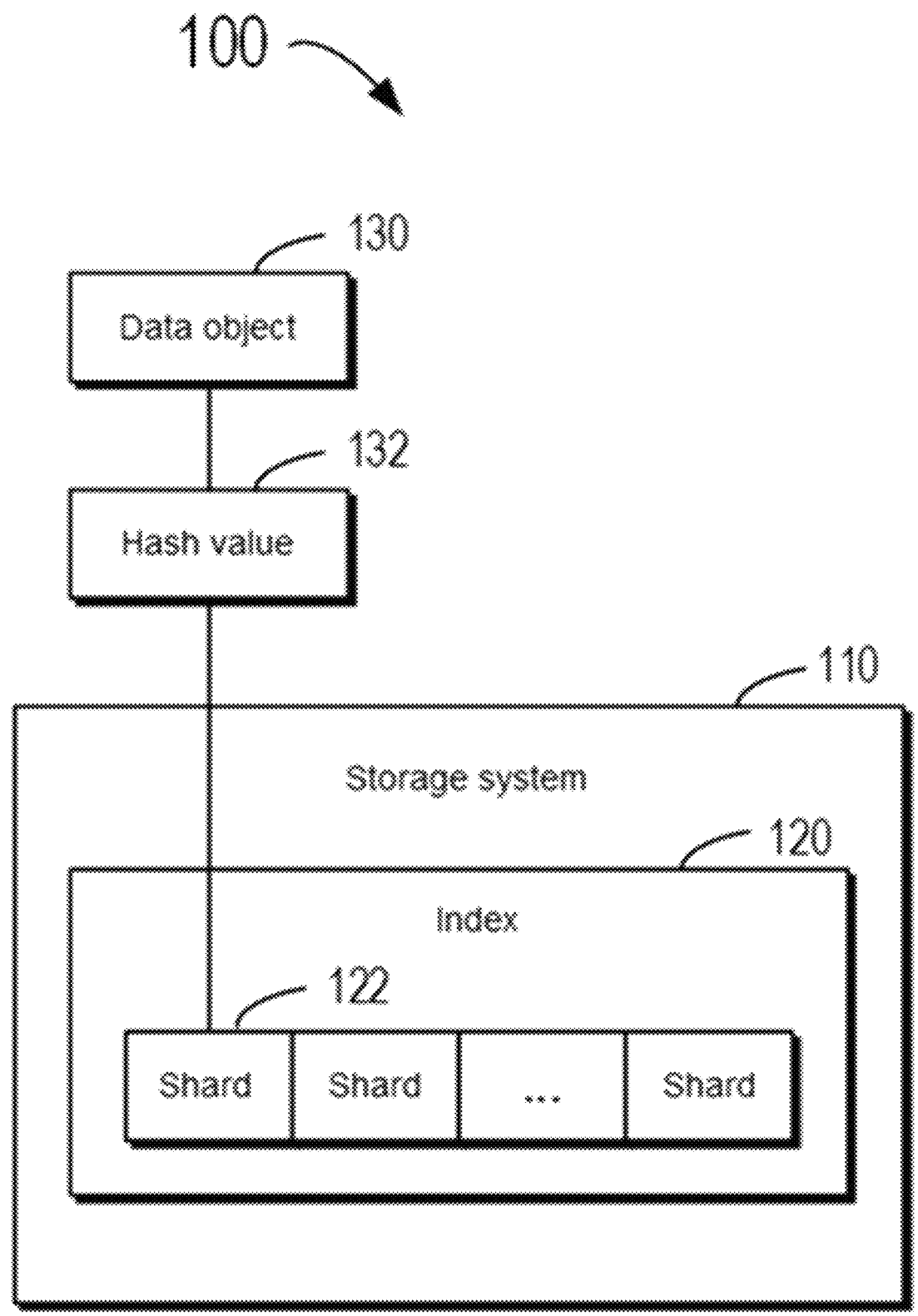
FIG. 1 schematically shows a schematic diagram of a working process of a storage system capable of implementing the method of the present disclosure.

In the following, preferred implementations of the present disclosure will be described in more detail with reference to the accompanying drawings. Although the preferred implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure can be fully conveyed to those skilled in the art.

As used herein, the term "including" and variations thereof mean open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," etc., may refer to different or the same objects. Other explicit and implicit definitions may also be included below.

Various streaming data storage systems have been developed at present. For ease of description, only a streaming data storage system for storing log data of an application system will be described as an example in the context of the present disclosure. The log data may be generated continuously in the application system. For example, the log data may be generated every minute (or at other time intervals). At this moment, the generated log data will be stored in the storage system in a time series. In order to facilitate later search and processing of the log data, an index may be created for the stored data.

At present, an index (for example, a Lucene index, etc.) based on full-text search has been proposed, and the full-text index has been widely used in various application systems. The full-text index may dynamically manage a data object (for example, the log data) stored in the storage system, and may provide a reverse index from words in the data object to the data object. In the process of data analysis, the reverse index helps to score a search result. If more search terms are mapped to the same data object, the data object is considered to be more relevant to the search term and may have a higher score.

The existing full-text index has a limit on the number of data objects that can be accommodated. When faced with endless streaming data, it is necessary to first partition the streaming data entering the storage system. At present, an elastic search technical solution has been proposed, partitioning may be carried out according to the range of keywords or hash values of data objects, and then each newly arrived data object may be stored in a corresponding partition. At this moment, the index of each data object may be stored in the partition. In the context of the present disclosure, a collection of all indexes may be referred to as an index of the storage system, and the partition may be referred to as a "shard."

In the following, referring to FIG. 1, the outline of the shard-based index is described. FIG. 1 schematically shows a block diagram of working process 100 of a storage system capable of implementing the method of the present disclosure. As shown in FIG. 1, storage system 110 includes index 120, and index 120 here may include a plurality of shards. Assuming that a predetermined hash function may map a keyword of a data object to the range of 0-255, the above range may be divided into a plurality of shards (for example, 3): the first shard may include a hash value of 0-84, the second shard may include a hash value of 85-169, and the third shard may include a hash value of 170-255. When data object 130 enters storage system 110, hash value 132 of data object 130 may be acquired. Assuming that hash value 132 of data object 130 is "20," data object 130 may be allocated to shard 122, and an index of data object 130 may be stored in shard 122. Here, the index of data object 130 may point to a storage space in storage system 110 where data object 130 is stored.

However, the number of shards is fixed when the index is initially created. In addition, since the reverse index stores the words in the mapping of the data objects, the data objects cannot be separated directly. A common solution is to delete a part of data objects belonging to an existing shard, and then insert the part into a newly created shard. This solution is similar to recreating an index for the data objects, which requires a lot of time and computational resource overheads.

On the other hand, a fixed number of shards has limited data processing capabilities and cannot cope with the data volume of streaming data that changes over time. If the entering speed of streaming data exceeds the limit of the processing capacity of the shards, the index generation speed will be lower than the speed of the streaming data entering the storage system, resulting in a data backlog. However, if too many shards are provided in the initial stage, a query needs to be executed in all the shards, resulting in low query efficiency. At this moment, it is desired that the index of the streaming data storage system may be managed in a more convenient and effective way.

According to an example implementation of the present disclosure, a technical solution for dynamically managing an index of a storage system is proposed. Specifically, an initial number of shards may be set for the index, and streaming data entering the storage system may be processed according to the initial number of shards. Various types of requests executed for the storage system may be continuously monitored, and the number of shards in the storage system may be dynamically adjusted according to loads of the shards in the index. With an example implementation of the present disclosure, the streaming data may be processed at a suitable speed. In this way, the streaming data that continuously enters the storage system may be processed.

Figure 2:
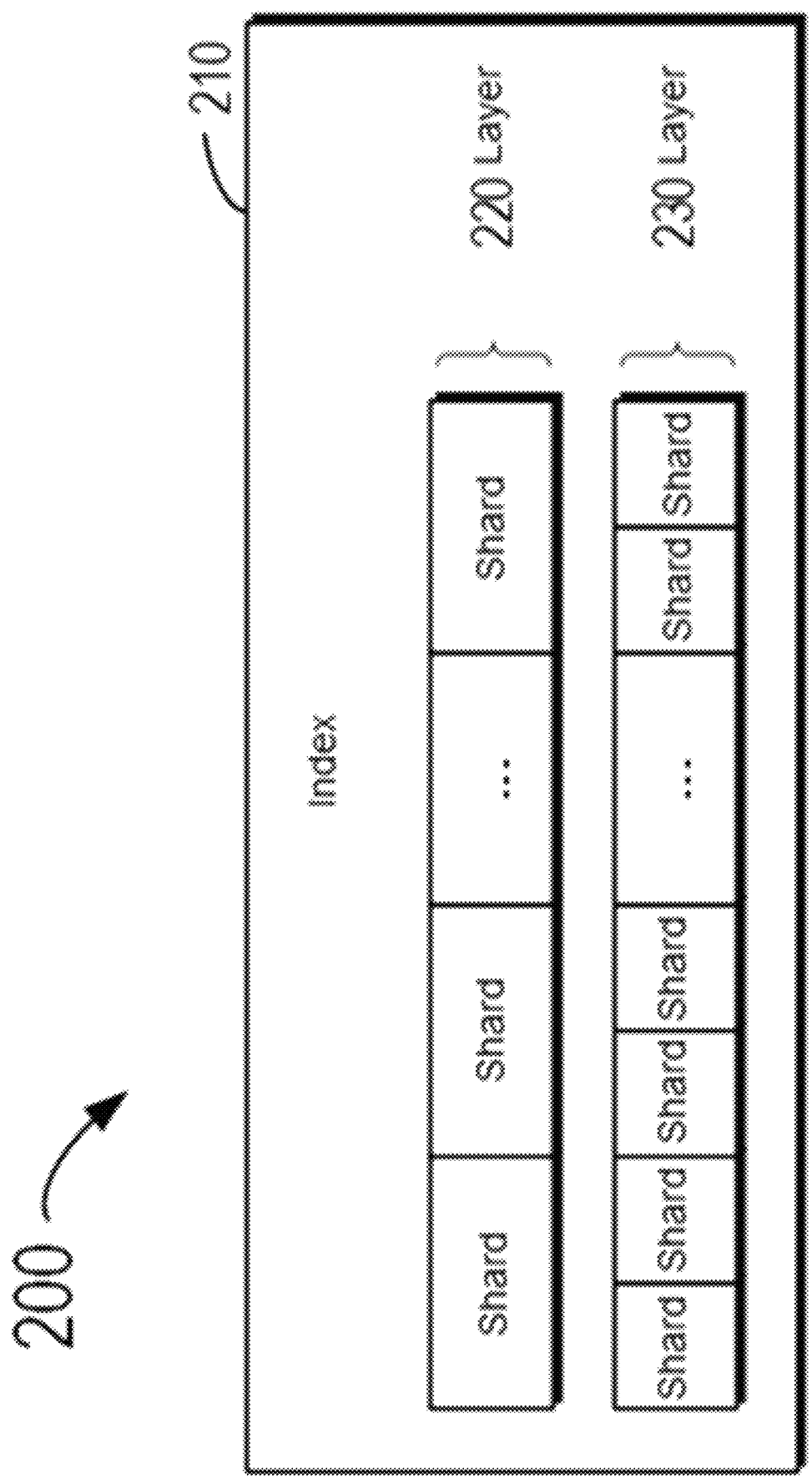
FIG. 2 schematically shows a block diagram of an index of a storage system according to a technical solution.

According to an example implementation of the present disclosure, the index may include one or more layers and each layer may include a group of shards. Specifically, the initial index may only include an active layer with a fixed number of shards. When the loads of the shards in this layer are too high, a new active layer may be recreated and the original active layer may be set as a frozen layer. FIG. 2 schematically shows a block diagram of index 200 of a storage system according to a technical solution. As shown in FIG. 2, assuming that the loads of shards in initial layer 220 are too high, layer 230 with a larger number of shards may be generated. At this moment, layer 220 may be set as a frozen layer, and layer 230 may be set as an active layer.

Figure 3:
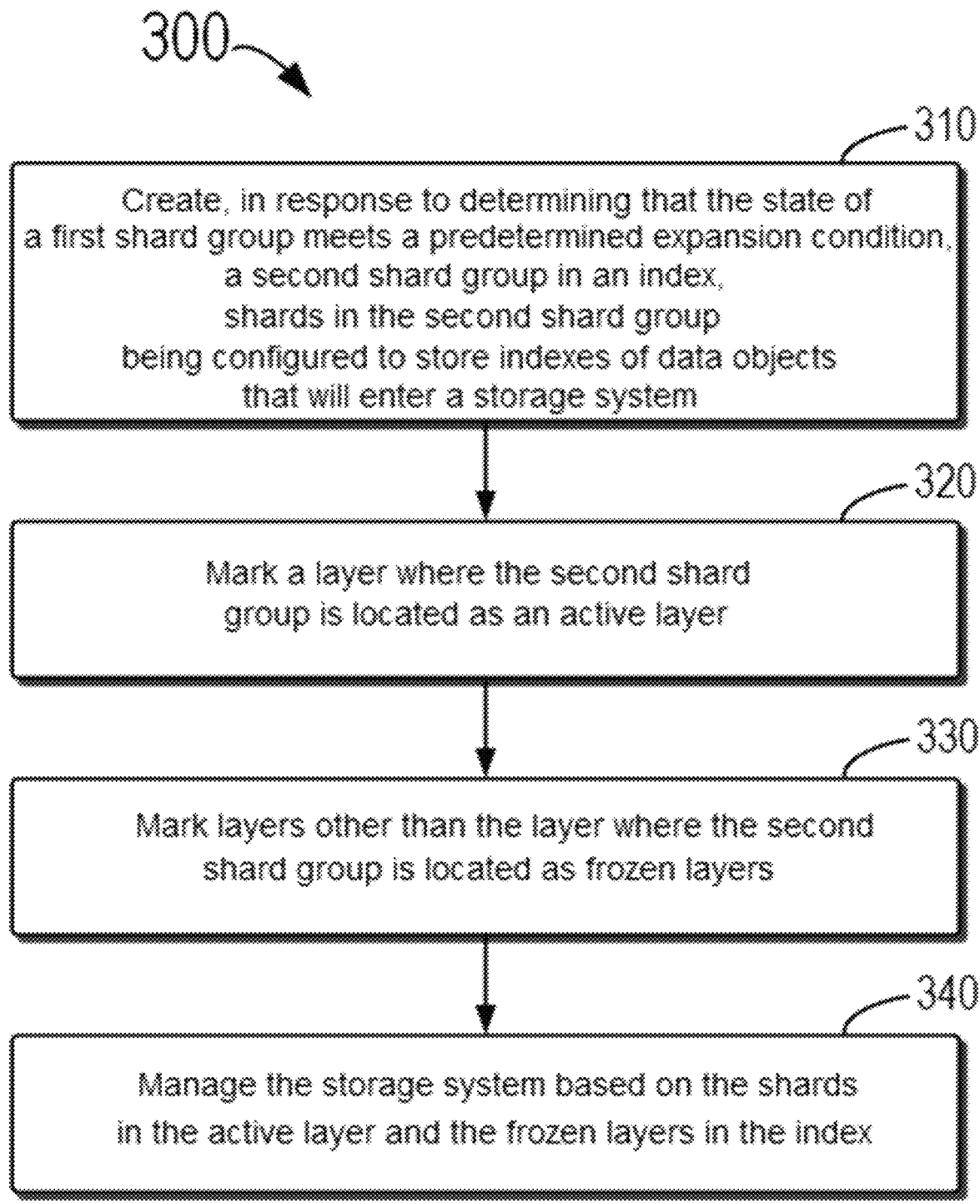
FIG. 3 schematically shows a flowchart of a method for managing an index of a storage system according to an implementation of the present disclosure.

In the following, more details about index management will be described with reference to FIG. 3. FIG. 3 schematically shows a flowchart of method 300 for managing an index of a storage system according to an implementation of the present disclosure. According to an example implementation of the present disclosure, an active layer of the index at the initial stage includes a first shard group, and shards in the first shard group are configured to store indexes of a part of data objects in the storage system. The first shard group here has a predetermined fixed number (for example, 3). At this moment, each shard stores indexes of a plurality of data objects, and hash values of keywords of the plurality of data objects belong to the hash value range of the shard.

In the context of the present disclosure, the index of a data object may represent a pointer to a specific address of the data object in the storage system. The index of the storage system may represent an overall collection of indexes of all data objects in the storage system. For example, the index of the data objects may include: indexes of the data objects in each shard in the active layer, and indexes of the data objects in each shard in one or more frozen layers.

Figure 4:
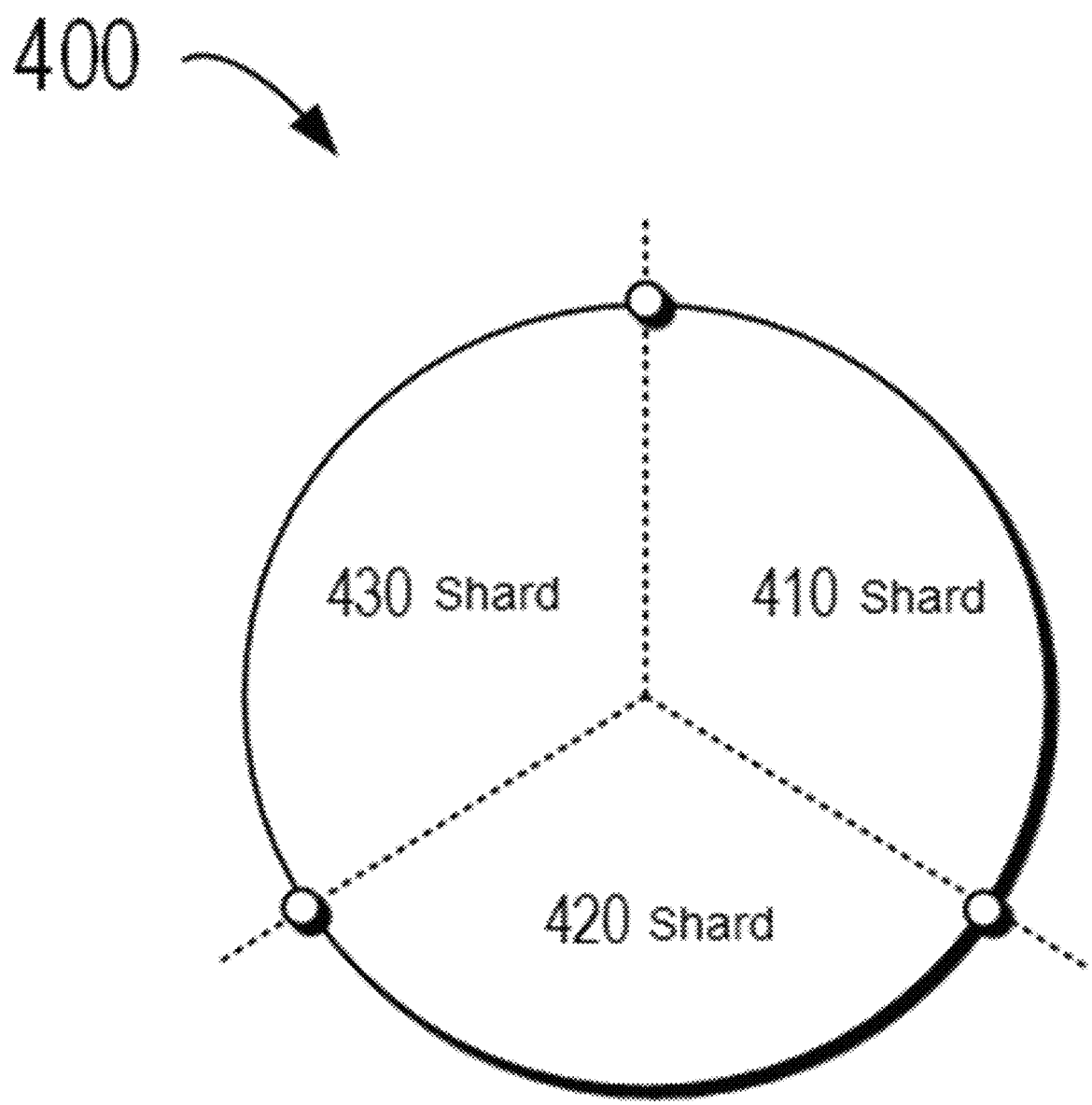
FIG. 4 schematically shows a block diagram for managing an index of a storage system according to an implementation of the present disclosure.

In the following, more details about the original first shard group will be described with reference to FIG. 4. FIG. 4 schematically shows a block diagram for managing index 400 of a storage system according to an implementation of the present disclosure. Index 400 in FIG. 4 may be an index created originally with a fixed number of shards. In FIG. 4, index 400 may be implemented based on a hash ring and includes three shards. Shard 410 is configured to store indexes of data objects with a hash value of 0-84, shard 420 is configured to store indexes of data objects with a hash value of 85-169, and shard 430 is configured to store indexes of data objects with a hash value of 170-255.

According to an example implementation of the present disclosure, the index of the data object may include a forward index (that is, mapping from keywords to words in the data object) and a reverse index (that is, mapping from words in the data object to the data object). With an example implementation of the present disclosure, an index based on a full-text search may be established, thereby facilitating later processing and analysis of data objects in the storage system.

It will be understood that FIG. 4 only schematically shows the case where a hash value ranges from 0 to 255 and three shards are included in an active layer. According to an example implementation of the present disclosure, the hash value may have different ranges, and the active layer may include other numbers of shards. For example, the range of the hash value may be 0-63, and the active layer may include four shards. At this moment, the ranges of hash values involved in each shard are: 0-15, 16-31, 32-47, and 48-63, respectively.

During the operation of the storage system, the state of the first shard group may be collected periodically. At block 310, in response to determining that the state of the first shard group meets a predetermined expansion condition, a second shard group is created in the index. Here, shards in the second shard group are configured to store indexes of data objects that will enter the storage system. According to an example implementation of the present disclosure, the number of second shards of the second shard group may be an integer multiple of the number of first shards of the first shard group. For example, if the original first shard group includes three shards, the created second shard group may include six shards. Each shard has a predetermined resource, so the workload of each shard has an upper limit. By creating more shards, each shard may manage and store indexes of data objects entering each shard in parallel.

According to an example implementation of the present disclosure, the predetermined expansion condition may include: the number of indexes stored in the first shard group being higher than a threshold number. It will be understood that as more data objects are stored in the storage system, the number of indexes stored in each shard will increase. At this moment, the workload of the shard will increase and performance will decrease. Therefore, when the number of indexes stored in each shard in the active layer reaches a predetermined threshold number, the delay of various requests executed for the storage system will increase, and the performance of the storage system will decrease. Furthermore, since the processing capacity of resources allocated to the shards has an upper limit, if the number of indexes continues to increase, the resource usage will reach the upper limit, and a crash or the like will occur. At this moment, the index expansion process may be executed to generate more shards, thereby alleviating the pressure of each shard in the current active layer and preventing slow response or even crashes.

According to an example implementation of the present disclosure, the predetermined expansion condition may include: the speed of storing indexes of a plurality of data objects entering the storage system based on the first shard group being lower than the speed of the plurality of data objects entering the storage system. When a new data object enters the storage system, computing resources of the shard will create an index for the new data object and store the created index in the shard. Since creating and storing indexes will have a certain time overhead, assuming that a large number of data objects enter the storage system, there is not enough time to process each data object that enters at this moment. It will be difficult for the processing capacity provided by the shard to meet the speed at which data objects enter the storage system. Therefore, the speed of generating and storing indexes becomes the bottleneck of the storage system and causes the performance of the storage system to decrease. At this moment, the expansion process may be executed to generate more shards, thereby improving the overall processing capacity of a plurality of shards.

Figure 5:
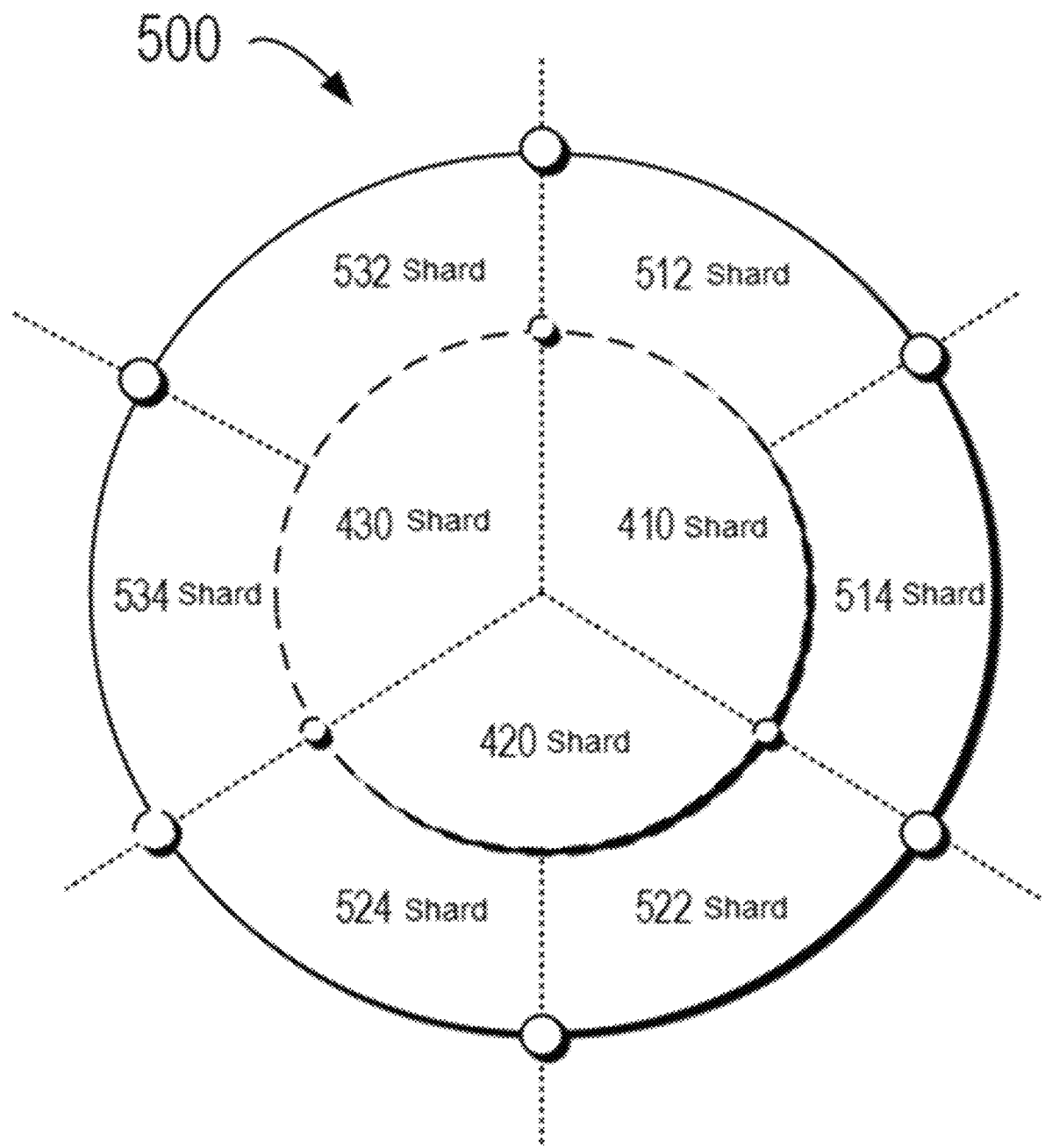
FIG. 5 schematically shows a block diagram of an expanded index according to an implementation of the present disclosure.

FIG. 5 schematically shows a block diagram of expanded index 500 according to an implementation of the present disclosure. As shown in FIG. 5, three shards 410, 420, and 430 in the original active layer are expanded to six shards, that is, shards 512, 514, 522, 524, 532, and 534. Specifically, the hash value range 0-84 of shard 410 may be halved. At this moment, the keyword range of shard 512 may be 0-42, and the keyword range of shard 514 may be 43-84. Similarly, the keyword ranges of 522, 524, 532, and 534 may be determined respectively.

At block 320, a layer where the second shard group is located is marked as the active layer (as shown by the solid line in the outer circle of FIG. 5). At block 330, layers other than the layer where the second shard group is located are marked as frozen layers (as shown by the dotted line in the inner circle of FIG. 5). It will be understood that at any time during the operation of the storage system, there is only one active layer in the index. At this moment, the second shard group may replace the first shard group and become "active." The active layer and the frozen layer may have different functions. Some requests to be executed for the storage system only involve the active layer, some requests only involve the frozen layer, and some requests will involve both the active layer and the frozen layer.

Figure 6:
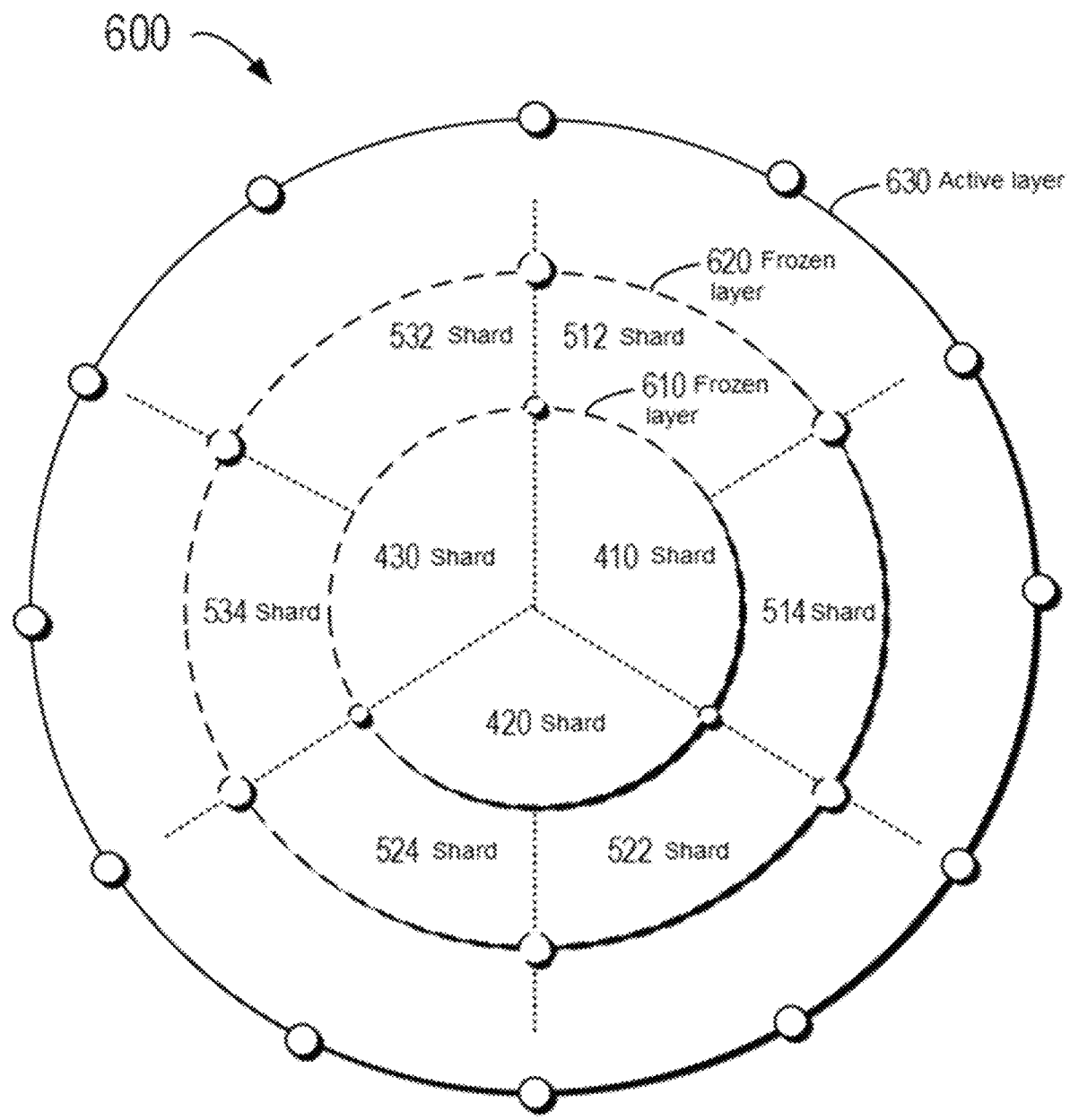
FIG. 6 schematically shows a block diagram of an expanded index according to an implementation of the present disclosure.

According to an example implementation of the present disclosure, the state of the current active layer may be continuously monitored and method 300 may be executed periodically. If the state of the current active layer including six shards meets the predetermined expansion condition, more shards (for example, 12 shards) may be created again. At this moment, the state of the index is shown in FIG. 6. FIG. 6 schematically shows a block diagram of expanded index 600 according to an implementation of the present disclosure. As shown in FIG. 6, an outermost hash ring (shown in solid lines) shows current active layer 630 including 12 shards, and a middle hash ring (shown in dashed lines) shows frozen layer 620 including six shards, and an innermost hash ring (shown in dashed lines) shows frozen layer 610 including three shards.

At this moment, the expansion process is successfully executed and the expanded index may be used to manage the storage system. In the following, more details about managing the storage system using an active layer and one or more frozen layers in an index will be described with reference back to FIG. 3. At block 340, the storage system is managed based on the shards in the active layer and the frozen layers in the index. According to an example implementation of the present disclosure, the storage system may receive various types of requests: an insert request, an update request, an upsert (which is a combination of update and insert) request, a delete request, and a search request. In the following, how to manage various types of requests executed for the storage system based on the shards in the active layer and the frozen layer in the index will be described respectively.

According to an example implementation of the present disclosure, if an insert request for inserting a data object into the storage system is received, an index of the data object may be generated. Further, the index of the data object may be stored in a shard corresponding to the data object in the active layer. Specifically, it is possible to determine a shard for storing, based on keywords of a data object to be inserted, an index of the data object. In the following, how to execute an insert operation is described back to FIG. 5. Assuming that the hash value of the keyword of the data object to be inserted is 70, based on the hash value range of each shard described above, the hash value range of shard 514 is 43-84. At this moment, the index of the data object should be stored in shard 514. For another example, assuming that the hash value of the keyword of the data object to be inserted is 30, the index of the data object should be stored in shard 512 (the hash value range is 0-42).

It will be understood that the above description only refers to FIG. 5 to describe the case where the active layer includes six shards. If the index is as shown in FIG. 6, the active layer includes 12 shards at this moment. The hash value ranges of the 12 shards may be determined respectively in a similar way, and a shard matching the hash value of the keyword of the data object to be inserted may be found according to the range.

According to an example implementation of the present disclosure, if an update request for updating a data object in the storage system is received, the data object may be searched in the active layer first, that is, it may also be determined whether the index of the data object is stored in the active layer. If it is determined that the index of the data object is stored to a shard in the active layer, an address of a data object to be updated in the storage system may be found directly based on the index in the shard. The data object may be read from the address and the read data object may be updated based on the update request, and then the index of the updated data object may be stored to the shard. Since the index of the data object to be updated at this moment is located in the active layer, an index operation related to the update request may be directly processed in the active layer.

In the following, referring to FIG. 5, the case where an index to be updated is stored in the active layer is described. It is assumed that the hash value of the keyword of a data object to be updated is 70, and an index of the data object is found in shard 514 in the active layer. An address of the data object may be found based on the index (for example, the index points to storage space 0x00 . . . 00-0x0f . . . ff in the storage system in a pointer manner). At this moment, data in the storage space may be updated based on the update request, and the index of the updated data object is stored to shard 514.

According to an example implementation of the present disclosure, if it is determined that the index of the data object is not stored in the active layer, the update request may be forwarded to each frozen layer in the index, and a similar operation may be executed in each frozen layer. If it is determined that the index of the data object to be updated is stored to a shard in the frozen layer, an address of the data object to be updated in the storage system may be found based on the index in the shard. The data object may be read from the address and the read data object may be updated based on the update request. Since the index of the updated data object is located in the frozen layer (the index in the frozen layer cannot be modified) at this moment, a new index may be created for the data object that has been updated, and the new index may be stored to the shard in the active layer. Specifically, a shard having a hash value range matching the hash value may be found in the active layer based on the hash value of the keyword of the data object. Further, the new index may be stored to the found shard. With an example implementation of the present disclosure, it may be ensured that the latest index of the updated data object is stored in the active layer.

In the following, referring to FIG. 5, the case where an index to be updated is stored in the frozen layer is described. It is assumed that the hash value of the keyword of a data object to be updated is 60, and an index of the data object is found in shard 410 in the frozen layer. An address of the data object may be found based on the index (for example, storage space 0x10 . . . 00-0x1f . . . ff). At this moment, data in the storage space may be updated based on the update request, and the index of the updated data object may be stored to the shard in the active layer. In the active layer, the hash value range of shard 514 is 43-84 and matches the hash value 60. Therefore, the index of the updated data object may be stored to shard 514 in the active layer.

It will be understood that since the data object has been updated at this moment, the old index in the shard in the frozen layer is no longer valid, and the old index of the data object may be deleted from the shard in the frozen layer. In the above example, the old index may be deleted from shard 410 in the frozen layer. With an example implementation of the present disclosure, it may be ensured that old indexes that are no longer valid are removed from the index. Then, when an operation needs to be executed on the updated data object, the corresponding latest index may be found from the shard in the active layer.

In the storage system, an upsert request for a data object may be executed. The upsert request here means: if a specified data object does not exist in the storage system, the data object is inserted into the storage system; and if the data object exists in the storage system, the data object in the storage system is updated. If an upsert request for updating and inserting a data object in the storage system is received, it may be determined whether the index of the data object is stored in the active layer. If it is determined that the index of the data object is stored to a shard in the active layer, the data object is updated and the index of the updated data object is stored to the shard. Here, since the index of the data object already exists in the active layer, it means that the data object has been stored in the storage system. Therefore, the upsert request here executes an update action, and the execution process is similar to the above-described case where the index of the data object to be updated is located in the active layer, so it will not be repeated.

According to an example implementation of the present disclosure, if it is determined that the index of the data object is not stored in the active layer, the upsert request is forwarded to each frozen layer. At this moment, it may be found whether there is an index of the data object in each frozen layer. If it is determined that the index of the data object is not stored in any frozen layer, it means that the data object is not stored in the storage system. Therefore, the upsert request here executes an insert action, and the index of the data object may be stored to the shard in the active layer. The execution process here is similar to the above-described case where the insert request is executed, so it will not be repeated.

According to an example implementation of the present disclosure, if it is determined that the index of the data object is stored to a shard in the frozen layer, it means that the data object has been stored in the storage system. Therefore, the upsert request here executes an update action. Specifically, the data object may be updated based on the upsert request, and the index of the updated data object may be stored to the shard in the active layer. Here, the execution process is similar to the above-described case where the index of the data object to be updated is located in the frozen layer, so it will not be repeated. According to an example implementation of the present disclosure, since the data object has been updated at this moment, the old index in the frozen layer is no longer valid, and the old index of the data object may be deleted from the shard in the frozen layer.

It will be understood that a plurality of shards in the active layer and one or more frozen layers in the index store indexes of all data objects in the storage system. Therefore, when a search request is executed, search needs to be carried out in the active layer and one or more frozen layers respectively. According to an example implementation of the present disclosure, if a search request for searching a data object in the storage system is received, the search request may be forwarded to the active layer and the frozen layer respectively. The search request may be executed in each layer separately, and search results from the active layer and the frozen layer are provided.

For example, it is assumed that the index here is a reverse index, and it is desired to perform a full-text search in a log storage system in order to find a log including a keyword "failure." At this moment, the search request may be forwarded to the active layer and all frozen layers in the index. Then, search may be carried out in the reverse index in each block in the active layer and all the frozen layers to find all logs including the keyword "failure." With an example implementation of the present disclosure, it may be ensured that the full-text search is performed in a more accurate and efficient way.

As the storage system runs, the storage system may include data objects that are incorrect or no longer valid. At this moment, specified data objects may be deleted from the storage system. According to an example implementation of the present disclosure, if a delete request for deleting a data object from the storage system is received, it may be determined first whether the index of the data object is stored in the active layer. If it is determined that the index of the data object is stored to a shard in the active layer, the index of the data object may be directly deleted from the shard in the active layer.

Specifically, based on the hash value of the keyword of a data object to be deleted, a corresponding shard may be found in the active layer, and a storage space where the data object to be deleted is located is found at an address specified by the index in the shard. Data in the storage space may be cleared and released. Since the data object itself has been deleted at this moment, the index of the data object is no longer valid, and the index may be deleted from the shard in the active layer. In this way, it may be ensured that the data objects and the indexes in the storage system have a one-to-one correspondence.

According to an example implementation of the present disclosure, a delete queue may be provided for the frozen layer. If it is determined that the index of the data object is not stored in the active layer, the delete request may be added to the delete queue, so as to notify each shard in the frozen layer of the delete request. Specifically, a similar operation may be executed in each frozen layer. In a certain frozen layer, if it is determined that the index of the data object is stored to a shard in the frozen layer, the storage space where the data object to be deleted is located may be found from the shard. Data in the storage space may be cleared and released. Since the data object itself has been deleted at this moment, the index of the data object is no longer valid, and the index may be deleted from the shard of the frozen layer. In this way, it may be ensured that the data objects and the indexes in the storage system have a one-to-one correspondence.

According to an example implementation of the present disclosure, an update history of the delete queue may be saved in a cache file. For example, if a certain delete request is added to the delete queue, the delete request may be recorded in the cache file, and the state of the delete request may be set to "not executed." If the delete request has been successfully executed, the state of the delete request may be marked as "executed."

According to an example implementation of the present disclosure, when an access request for the storage system is received, the access request may be filtered based on the above-mentioned cache file. Here, the access request includes at least any one of an update request, a delete request, and a search request. If the access request involves a data object that is recorded in the cache file and has been deleted, a notification that the data object has been deleted may be provided directly. Specifically, if an access request for a data object in the storage system is received, the cache file may be searched for a delete request associated with the data object. If the delete request is found, it means that a data object to be accessed has been deleted, and notifications may be provided directly without having to search in each layer in the index respectively.

The process for expanding a shard in an index has been described above. According to an example implementation of the present disclosure, the state of the shards in the active layer may be regularly monitored and the expansion operation may be executed when needed. It will be understood that the workload in the storage system may change, and too many layers and/or shards may increase the complexity of management. At this moment, a shrinking process may be executed for the shards in the index. The shrinking process may include intra-layer shrinkage and inter-layer shrinkage. In the following, more details will be provided with reference to FIGS. 7 and 8 respectively.

According to an example implementation of the present disclosure, if it is determined that the number of indexes stored in the layer in the index is lower than a threshold number, the shards in the layer may be combined. It will be understood that as the delete request, the update request, or the upsert request is executed in the storage system, the number of indexes stored in the layer may decrease. At this moment, excessive shards in the layer may be combined to reduce the computational resource overhead and management complexity of the excessive shards.

Figure 7:
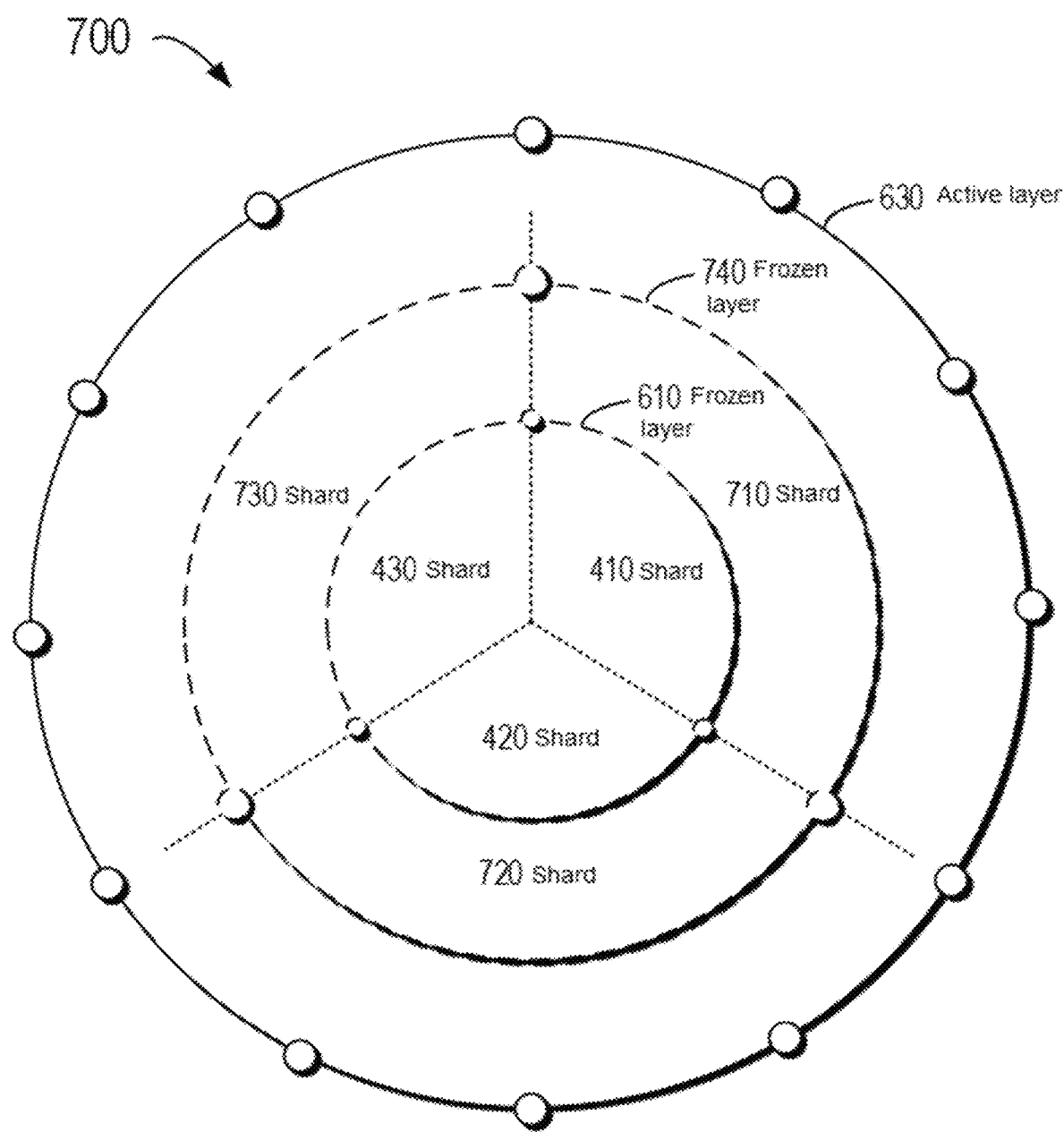
FIG. 7 schematically shows a block diagram of an index after intra-layer combination according to an implementation of the present disclosure.

Assuming that the number of indexes in frozen layer 620 in index 600 as shown in FIG. 6 drops below the threshold number, combination may be executed in frozen layer 620. Specifically, shards 512 and 514 may be combined, shards 522 and 524 may be combined, and shards 532 and 534 may be combined. FIG. 7 schematically shows a block diagram of index 700 after intra-layer combination according to an implementation of the present disclosure. In FIG. 7, shard 710 is from shards 512 and 514 before combination, shard 720 is from shards 522 and 524 before combination, and shard 730 is from shards 532 and 534 before combination.

According to an example implementation of the present disclosure, the number of shards of the layer before combination is an integer multiple of the number of shards of the layer after combination. For example, the number of shards "6" in frozen layer 620 before combination is twice the number of shards "3" in frozen layer 740 after combination. With an example implementation of the present disclosure, the expansion and shrinkage processes are executed based on integer multiples. In this way, by combination between shards with the same hash value space, the complexity of managing the index can be simplified, and the possibility of abnormalities during expansion and shrinkage can be reduced.

According to an example implementation of the present disclosure, if the speed of storing indexes of a plurality of data objects entering the storage system based on the shards in the layer is higher than the speed of the plurality of data objects entering the storage system, the shards in the layer may be combined. It will be understood that it is necessary to ensure that the processing speed of the shards in the layer after combination is higher than the speed of the plurality of data objects entering the storage system. Assuming that the speed of writing data objects to the storage system drops greatly and the processing speed of 12 shards in active layer 630 is much higher than the speed of the data objects entering the storage system at this moment, the 12 shards may be combined into six shards.

Figure 8:
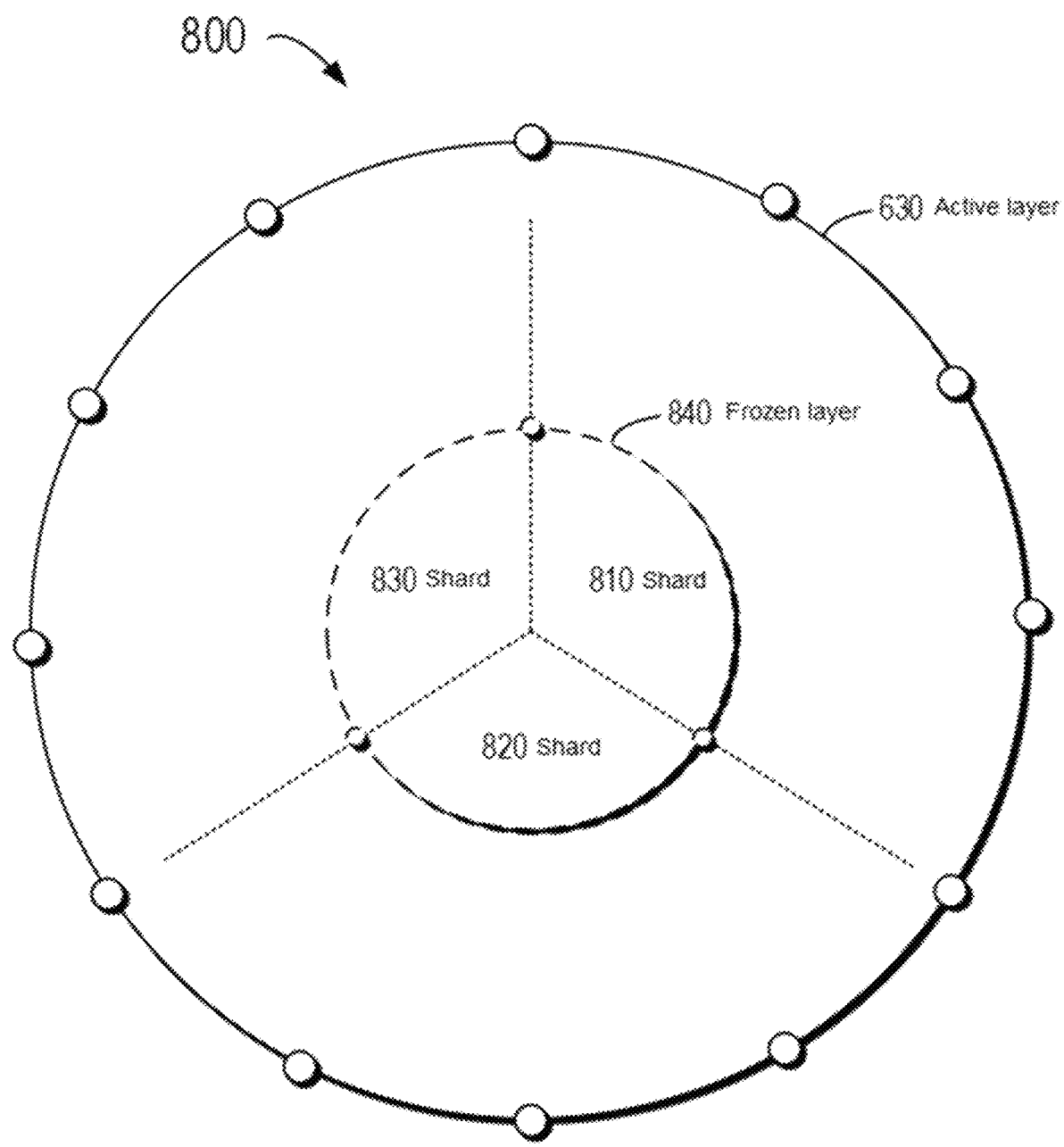
FIG. 8 schematically shows a block diagram of an index after inter-layer combination according to an implementation of the present disclosure.

It will be understood that if the number of layers in the index is too large, management complexity will also increase, and inter-layer combination may be executed at this moment. According to an example implementation of the present disclosure, if it is determined that the number of indexes stored in a plurality of layers in the index is lower than the threshold number, shards in the plurality of layers may be combined. In FIG. 7, the shards in frozen layer 740 and frozen layer 610 may be combined. Specifically, shards 410 and 710 may be combined, shards 420 and 720 may be combined, and shards 430 and 730 may be combined. FIG. 8 schematically shows a block diagram of index 800 after inter-layer combination according to an implementation of the present disclosure. In FIG. 8, frozen layer 840 is from frozen layer 740 and frozen layer 610 in FIG. 7, and frozen layer 840 includes three shards: shards 810, 820, and 830. With an example implementation of the present disclosure, the number of layers in the index can be reduced, thereby reducing the complexity of managing the index.

It will be understood that in order to avoid a failure in the combination that will have an adverse effect on the index, each relevant layer before the combination may be backed up and stored in advance. If an abnormal operation or other failure occurs during the combination process, each relevant layer may be rolled back to a version backed up in advance. If the combination process is successfully performed, the backed-up version may be deleted. With an example implementation of the present disclosure, it may be ensured that the index of the storage system may be restored to the previous correct version when a failure occurs, thereby improving the reliability of index management.

The example of method 300 according to the present disclosure has been described in detail above with reference to FIGS. 2 to 8. It will be understood that the method described above may be executed on a single device or the method described above may be executed on a plurality of devices in a distributed manner. The implementation of a corresponding apparatus will be described in the following. According to an example implementation of the present disclosure, an apparatus for managing an index of a streaming data storage system is provided. Here, an active layer of the index includes a first shard group, and shards in the first shard group are configured to store indexes of a part of data objects in the storage system. The apparatus includes: a creation module, configured to create, in response to determining that the state of the first shard group meets a predetermined expansion condition, a second shard group in the index, shards in the second shard group being configured to store indexes of data objects that will enter the storage system; an active layer marking module, configured to mark a layer where the second shard group is located as the active layer; a frozen layer marking module, configured to mark layers other than the layer where the second shard group is located as frozen layers; and a management module, configured to manage the storage system based on the shards in the active layer and the frozen layers in the index. According to an example implementation of the present disclosure, this apparatus may include modules for performing other steps in method 300 described above.

Figure 9:
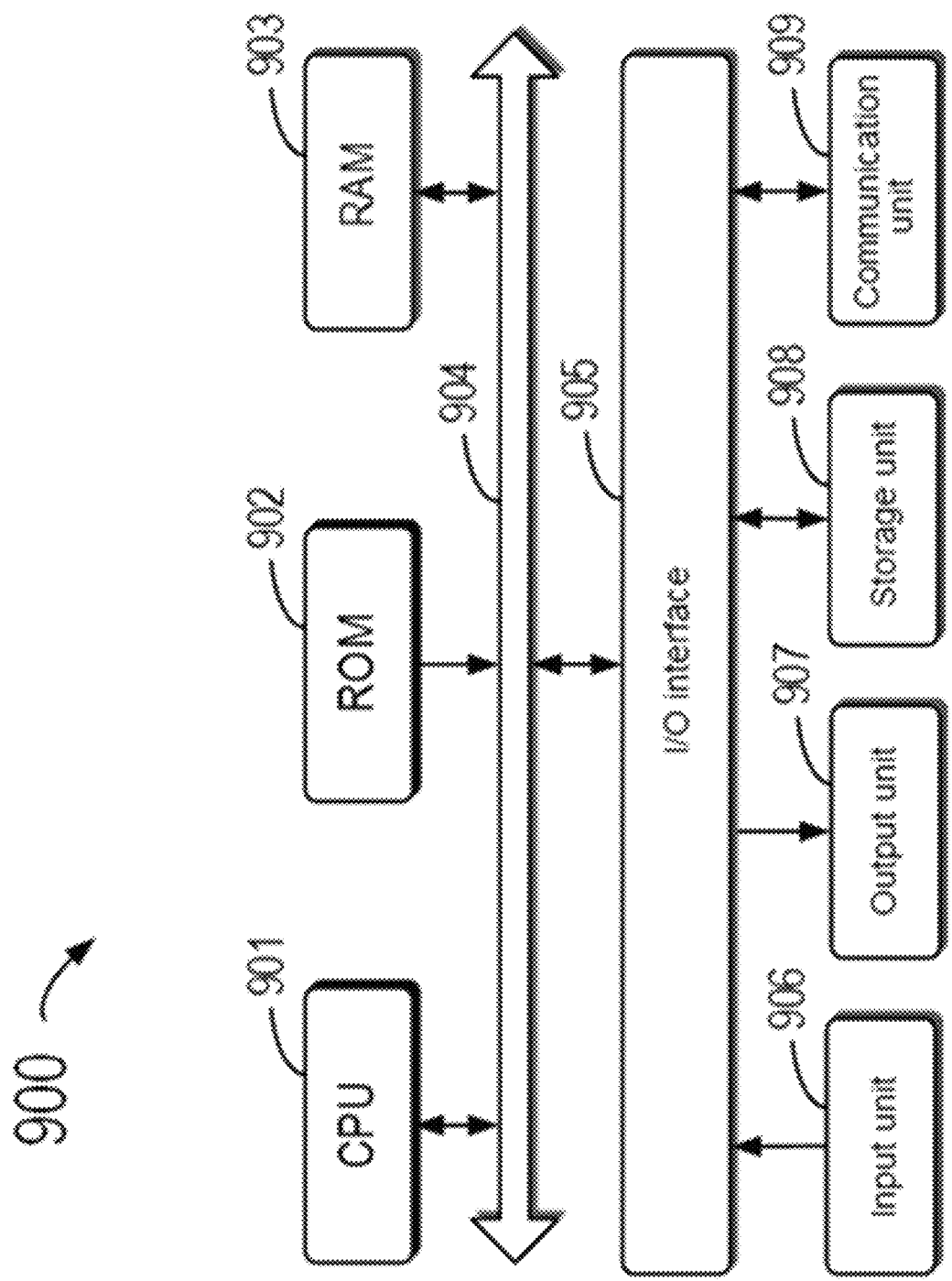
FIG. 9 schematically shows a block diagram of a device for managing an index of a storage system according to an example implementation of the present disclosure.

FIG. 9 schematically shows a block diagram of device 900 for managing an index of a storage system according to an example implementation of the present disclosure. As shown in the figure, device 900 includes central processing unit (CPU) 901 that may perform various appropriate actions and processing according to a computer program instruction stored in read-only memory (ROM) 902 or a computer program instruction loaded from storage unit 908 into random access memory (RAM) 903. Various programs and data required by the operation of device 900 may also be stored in RAM 903. CPU 901, ROM 902, and RAM 903 are connected to one another through bus 904. Input/output (I/O) interface 905 is also connected to bus 904.

Multiple components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices through a computer network such as the Internet and/or various telecommunication networks.

The various processes and processing described above, such as method 300, may be performed by processing unit 901. For example, in some implementations, method 300 may be implemented as a computer software program that is tangibly included in a machine-readable medium, such as storage unit 908. In some implementations, some or all of the computer program may be loaded and/or installed onto device 900 via ROM 902 and/or communication unit 909. One or more steps of method 300 described above may be performed when the computer program is loaded into RAM 903 and executed by CPU 901. Alternatively, in other implementations, CPU 901 may also be configured in any other suitable manner to implement the above processes/methods.

According to an example implementation of the present disclosure, an electronic device is provided. The electronic device includes: at least one processor; a volatile memory; and a memory coupled to the at least one processor. The memory has instructions stored therein. When executed by the at least one processor, the instructions cause the device to execute a method for managing an index of a streaming data storage system. An active layer of the index includes a first shard group, and shards in the first shard group are configured to store indexes of a part of data objects in the storage system. The method includes: creating, in response to determining that the state of the first shard group meets a predetermined expansion condition, a second shard group in the index, shards in the second shard group being configured to store indexes of data objects that will enter the storage system; marking a layer where the second shard group is located as the active layer; marking layers other than the layer where the second shard group is located as frozen layers; and managing the storage system based on the shards in the active layer and the frozen layers in the index.

According to an example implementation of the present disclosure, the predetermined expansion condition includes at least any one of the following: the number of indexes stored in the first shard group being higher than a threshold number; and the speed of storing indexes of a plurality of data objects entering the storage system based on the first shard group being lower than the speed of the plurality of data objects entering the storage system.

According to an example implementation of the present disclosure, managing the storage system includes: in response to receiving an insert request for inserting a data object into the storage system, generating an index of the data object; and storing the index of the data object to a shard corresponding to the data object in the active layer.

According to an example implementation of the present disclosure, managing the storage system includes: in response to receiving an update request for updating a data object in the storage system, determining whether an index of the data object is stored in the active layer; and updating, in response to determining that the index of the data object is stored to a shard in the active layer, the data object and storing an index of the updated data object to the shard.

According to an example implementation of the present disclosure, the method further includes: forwarding, in response to determining that the index of the data object is not stored in the active layer, the update request to the frozen layer; and updating, in response to determining that the index of the data object is stored to a shard in the frozen layer, the data object and storing an index of the updated data object to a shard in the active layer.

According to an example implementation of the present disclosure, the method further includes: deleting the index of the data object from the shard in the frozen layer.

According to an example implementation of the present disclosure, managing the storage system includes: in response to receiving an upsert request for updating and inserting a data object in the storage system, determining whether an index of the data object is stored in the active layer; and updating, in response to determining that the index of the data object is stored to a shard in the active layer, the data object and storing an index of the updated data object to the shard.

According to an example implementation of the present disclosure, the method further includes: forwarding, in response to determining that the index of the data object is not stored in the active layer, the upsert request to the frozen layer; and storing, in response to determining that the index of the data object is not stored in the frozen layer, the index of the data object to a shard in the active layer.

According to an example implementation of the present disclosure, the method further includes: updating, in response to determining that the index of the data object is stored to a shard in the active layer, the data object based on the upsert request; and storing an index of the updated data object to a shard in the active layer.

According to an example implementation of the present disclosure, the method further includes: deleting the index of the data object from the shard in the frozen layer.

According to an example implementation of the present disclosure, the method for managing the storage system includes: in response to receiving a search request for searching a data object in the storage system, forwarding the search request to the active layer and the frozen layer respectively; and providing search results from the active layer and the frozen layer.

According to an example implementation of the present disclosure, the method for managing the storage system includes: in response to receiving a delete request for deleting a data object from the storage system, determining whether an index of the data object is stored in the active layer; and deleting, in response to determining that the index of the data object is stored to a shard in the active layer, the index of the data object from the shard in the active layer.

According to an example implementation of the present disclosure, the method further includes: in response to determining that the index of the data object is not stored in the active layer, adding the delete request to a delete queue of the frozen layer to notify a shard in the frozen layer of the delete request.

According to an example implementation of the present disclosure, the method further includes: deleting, in response to determining that the index of the data object is stored to a shard in the frozen layer, the index of the data object from the shard in the frozen layer.

According to an example implementation of the present disclosure, the method further includes: searching, in response to receiving an access request for a data object in the storage system, a delete request associated with the data object based on an update history of the delete queue, wherein the access request includes at least any one of an update request, a delete request, and a search request; and providing, in response to finding the delete request, a notification that the data object has been deleted.

According to an example implementation of the present disclosure, a computer program product is provided. The computer program product is tangibly stored on a non-transitory computer-readable medium and includes machine-executable instructions which are used to execute the method according to the present disclosure.

According to an example implementation of the present disclosure, a computer-readable medium is provided. The computer-readable medium stores machine-executable instructions which, when executed by at least one processor, cause the at least one processor to implement the method according to the present disclosure.

The present disclosure may be a method, a device, a system, and/or a computer program product. The computer program product may include a computer-readable storage medium, on which computer-readable program instructions used for executing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signal transmitted via electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The computer-readable program instructions are received by a network adapter card or network interface of each computing/processing device from the network, and are forwarded to be stored in the computer-readable storage medium of each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be completely executed on a user's computer, partially executed on a user's computer, executed as an independent software package, partially executed on a user's computer and partially executed on a remote computer, or completely executed on a remote computer or a server. In cases where a remote computer is involved, the remote computer may be connected to a user's computer over any kind of networks, including a local area network (LAN) or a wide area network (WAN), or may be connected to an external computer (e.g., over the Internet by using an Internet service provider). In some implementations, an electronic circuit, for example, a programmable logic circuit, a field programmable gate array (FPGA), or a programmable logic array (PLA), is personalized by utilizing state information of computer-readable program instructions, and the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow chart and/or block diagrams and combinations of blocks in the flow charts and/or block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. The computer-readable program instructions may also be stored in the computer-readable storage medium, and the instructions cause a computer, a programmable data processing apparatus, and/or other devices to work in a specific manner, such that the computer-readable medium having instructions stored includes an article of manufacture that includes instructions for implementing various aspects of the functions/actions specified in one or more blocks in the flow charts and/or block diagrams.

The computer-readable program instructions may also be loaded onto computers, other programmable data processing apparatuses, or other devices, so that a series of operating steps may be executed on the computers, other programmable data processing apparatuses, or other devices to produce a computer-implemented process. Therefore, the instructions executed on the computers, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of systems, methods, and computer program products according to multiple implementations of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should also be noted that each block in the block diagrams and/or flow charts and a combination of blocks in the block diagrams and/or flow charts may be implemented by a dedicated hardware-based system for executing specified functions or actions, or may be implemented by a combination of dedicated hardware and computer instructions.

Various implementations of the present disclosure have been described above. The above description is illustrative and not exhaustive, and is not limited to the various implementations disclosed. Many modifications and variations will be apparent to those of ordinary skill in the art without departing from the scope and spirit of the illustrated various implementations. The selection of terms as used herein is intended to best explain principles and practical applications of the various implementations or improvements to technologies on the market, or to enable other persons of ordinary skill in the art to understand the implementations disclosed here.

What is claimed is:

1. A method for managing a first index of a streaming data storage system, an active layer of the first index comprising a first shard group, first shards in the first shard group being configured to store second indexes of a part of first data objects in the streaming data storage system, the method comprising:

creating, by a system comprising a processor in response to determining that a state of the first shard group meets a defined expansion condition, a second shard group in the first index, wherein second shards in the second shard group are configured to store third indexes of second data objects that will enter the streaming data storage system, wherein the defined expansion condition is a condition selected from a group of conditions comprising:

a number of the second indexes stored in the first shard group being higher than a threshold number; and a first speed of storing respective ones of the second indexes, corresponding to a plurality of the first data objects entering the streaming data storage system based on the first shard group, being lower than a second speed of the plurality of the first data objects entering the streaming data storage system;

marking, by the system, a first layer of the first index, where the second shard group is located, as the active layer;

marking, by the system, second layers of the first index, other than a second layer of the second layers where the second shard group is located, as frozen layers; and managing, by the system, the streaming data storage system based on the second shards in the active layer and the first shards in the frozen layers.

2. The method according to claim 1, wherein managing the streaming data storage system comprises:

in response to receiving an insert request for inserting a new data object, of the second data objects, into the streaming data storage system;

generating a third index, of the third indexes, for the new data object; and storing the third index of the new data object to a second shard, of the second shard group and stored in the active layer, corresponding to the new data object.

3. The method according to claim 1, wherein managing the streaming data storage system comprises:

in response to receiving an update request for updating a target data object in the streaming data storage system:

determining whether an index of the target data object is a third index, of the third indexes, stored to a second shard, of the second shard group and in the active layer; and in response to determining that the index of the target data object is the third index:

updating the target data object, resulting in an updated data object; and storing an updated index of the updated data object to the second shard.

4. The method according to claim 3, further comprising:

forwarding, by the system in response to determining that the index of the target data object is not the third index, the update request to a frozen layer of the frozen layers; and in response to determining that the index of the target data object is a second index, of the second indexes and stored to a first shard, of the first shard group and in the frozen layer:

updating, by the system, the target data object, resulting in the updated data object; and storing, by the system, the updated index of the updated data object to the second shard in the active layer.

5. The method according to claim 4, further comprising: deleting, by the system, the index of the target data object from the first shard in the frozen layer.

6. The method according to claim 1, wherein managing the streaming data storage system comprises:

in response to receiving an upsert request for updating and inserting a target data object in the streaming data storage system:

determining whether an index of the target data object is a third index, of the third indexes, stored to a second shard, of the second shard group and in the active layer; and in response to determining that the index of the target data object is the third index:

updating the target data object, resulting in an updated data object; and storing an updated index of the updated data object to the second shard.

7. The method according to claim 6, further comprising:

forwarding, by the system in response to determining that the index of the target data object is not the third index stored in the active layer, the upsert request to a frozen layer of the frozen layers; and storing, by the system in response to determining that the index of the target data object is not a second index, of the second indexes and stored in the frozen layer, the index of the target data object to the second shard in the active layer.

8. The method according to claim 7, further comprising:

updating, by the system in response to determining that the index of the target data object is stored to a third shard, distinct from the second shard, of the second shard group and in the active layer, the target data object based on the upsert request, resulting in the updated data object; and storing, by the system, the updated index of the updated data object to the third shard in the active layer.

9. The method according to claim 8, further comprising: deleting, by the system, the index of the target data object from the frozen layer.

10. The method according to claim 1, wherein managing the streaming data storage system comprises:

in response to receiving a search request for searching a target data object in the streaming data storage system:

forwarding the search request to the active layer and a frozen layer of the frozen layers, respectively; and providing search results from the active layer and the frozen layer.

11. The method according to claim 1, wherein managing the streaming data storage system comprises:

in response to receiving a delete request for deleting a target data object from the streaming data storage system:

determining whether an index of the target data object is a third index, of the third indexes and stored to a second shard, of the second shard group and in the active layer; and deleting, in response to determining that the index of the target data object is the third index, the index of the target data object from the second shard.

12. The method according to claim 11, further comprising:

in response to determining that the index of the target data object is not the third index stored in the active layer, adding, by the system, the delete request to a delete queue of a frozen layer of the frozen layers to notify a first shard, of the first shard group and in the frozen layer, of the delete request.

13. The method according to claim 12, further comprising:
deleting, by the system in response to determining that the index of the target data object is a second index, of the second indexes and stored to the first shard in the frozen layer, the index of the target data object from the first shard in the frozen layer.

14. The method according to claim 12, wherein the delete request is a first delete request, and wherein the method further comprises:
searching, by the system in response to receiving an access request for the target data object, the first delete request associated with the target data object based on an update history of the delete queue, wherein the access request is of a type selected from a group of types comprising an update request, a second delete request, and a search request; and
providing, by the system in response to finding the delete request, a notification that the target data object has been deleted.

15. The method according to claim 1, wherein the number of the second indexes stored in the first shard group is a first number, and wherein managing the streaming data storage system comprises:
combining shards in a layer, selected from a first group comprising the active layer and the frozen layers and in the first index, in response to a defined contraction condition selected from a group comprising:
the first number of indexes, selected from a second group comprising the second indexes and the third indexes and stored in the layer of the first index, being lower than the threshold number; and
the first speed of storing the respective ones of the second indexes, corresponding to the plurality of the first data objects entering the streaming data storage system based on the first shard group, being higher than the second speed of the plurality of the first data objects entering the streaming data storage system,
wherein a second number of shards of the layer before combination is an integer multiple of a third number of the shards in the layer after combination.

16. The method according to claim 15, wherein the first index is associated with a layer group, comprising the active layer and at least one frozen layer of the frozen layers, and wherein managing the streaming data storage system comprises:
combining respective shards in the layer group in response to determining that a combined number, of the second indexes and the third indexes stored in the layer group, is lower than the threshold number.

17. The method according to claim 1, wherein a first number of the second shards of the second shard group is an integer multiple of a second number of the first shards of the first shard group, and wherein the first shards in the first shard group are configured to store the second indexes of the part of the first data objects in the streaming data storage system based on a hash ring, and wherein the second indexes of the part of the first data objects comprise a reverse index.

18. An electronic device, comprising:
at least one processor;
a volatile memory; and
a memory coupled to the at least one processor, the memory having instructions stored therein, and the instructions, when executed by the at least one processor, causing the device to execute operations for managing a first index of a streaming data storage system, an active layer of the first index comprising a first shard group, first shards in the first shard group being configured to store second indexes of a part of first data objects in the streaming data storage system, the operations comprising:
creating, in response to determining that a state of the first shard group meets a defined expansion condition, a second shard group in the first index, wherein second shards in the second shard group are configured to store third indexes of second data objects that will enter the streaming data storage system, wherein the defined expansion condition is a condition selected from a group of conditions comprising:
a number of the second indexes stored in the first shard group being higher than a threshold number; and
a first speed of storing respective ones of the second indexes, corresponding to a plurality of the first data objects entering the streaming data storage system based on the first shard group, being lower than a second speed of the plurality of the first data objects entering the streaming data storage system;
marking a first layer of the first index, where the second shard group is located, as the active layer;
marking second layers of the first index, other than a second layer of the second layers where the second shard group is located, as frozen layers; and
managing the streaming data storage system based on the second shards in the active layer and the first shards in the frozen layers.

19. A non-transitory computer program product tangibly stored on a non-transitory computer-readable medium and containing machine-executable instructions that facilitate performance of operations for managing a first index of a streaming data storage system, an active layer of the first index comprising a first shard group, first shards in the first shard group being configured to store second indexes of a part of first data objects in the streaming data storage system, the operations comprising:
creating, in response to determining that a state of the first shard group satisfies a predetermined expansion condition, a second shard group in the first index, wherein second shards in the second shard group are configured to store third indexes of second data objects that will enter the streaming data storage system, wherein the predetermined expansion condition is a condition selected from a group of conditions comprising:
a number of the second indexes stored in the first shard group being higher than a threshold number; and
a first speed of storing respective ones of the second indexes, corresponding to a plurality of the first data objects entering the streaming data storage system based on the first shard group, being lower than a second speed of the plurality of the first data objects entering the streaming data storage system;
marking a first layer of the first index, where the second shard group is located, as the active layer;
marking second layers of the first index, other than a second layer of the second layers where the second shard group is located, as frozen layers; and
managing the streaming data storage system based on the second shards in the active layer and the first shards in the frozen layers.

* * * * *